INVENTOR
ALEXANDER TURCZYN

BY Griffin and Stokes
ATTORNEYS

Aug. 24, 1965

A. TURCZYN 3,202,830

DUAL FUNCTION CORE LOGIC

Filed May 25, 1961

3 Sheets-Sheet 2

United States Patent Office 3,202,830
Patented Aug. 24, 1965

3,202,830

DUAL FUNCTION CORE LOGIC

Alexander Turczyn, Philadelphia, Pa., assignor to Sperry Rand Corporation, New York, N.Y., a corporation of Delaware Filed May 25, 1961, Ser. No. 112,732
23 Claims. (Cl. 307—88)

The present invention relates to magnetic core logic circuits. More particularly, the present invention provides magnetic core logic circuits wherein the same cores are used to mechanize both the logical AND and the logical OR functions, and wherein similar cores perform auxiliary functions, thereby reducing the number of elements required to mechanize a logical proposition.

Logical networks of the prior art have utilized transistors and magnetic cores in combination to perform logical operations. However in many instances, these networks have used more components than necessary to perform a given logical operation. The extra components used create additional possibilities of malfunction and may thereby decrease the reliability of the system. Furthermore, in systems of the prior art it has been customary to use cores of one type to perform the logical operations while using cores of a different type to provide auxiliary functions such as generation of clock pulses and the stretching of output pulses.

Therefore, an object of the present invention is to provide a magnetic core logic circuit wherein the same cores are used to provide the logical AND and OR functions thereby reducing the number of logic cores required and at the same time, increasing the reliability of the circuit.

A further object of the invention is to reduce the number of transistors required in combination with magnetic cores for performing logical operations.

A further object of the invention is to provide magnetic core logic circuits wherein the same type core may be used to implement the logic function, generate clock pulses, or stretch output pulses.

Another object of the invention is to provide improved magnetic core logic circuits in which all of the core windings may be one-turn windings.

Still another object of the invention is to provide improved magnetic core logic circuits in which the number of inputs to any AND or OR gate may be as high as ten or more.

A feature of the present invention is the provision of a novel magnetic core logic circuit for determining the truth of the generalized logical equation, $$D=[F_{11}\cdot F_{12}\cdot - - -\cdot F_{1N_1}]+[F_{21}\cdot F_{22}\cdot - - -\cdot F_{2N_2}]+[F_{31}\cdot F_{32}\cdot - - -\cdot F_{3N_3}]+[F_{X_1}\cdot F_{X2}\cdot - - -\cdot F_{XN_X}]$$

where the dot $(\cdot)$ represents the logical AND function, the plus $(+)$ represents the logical OR function, and the truth of the function D or F is represented by the absence of a pulse. The circuit may be mechanized with only X magnetic cores where X is the number of terms in the equation. Each core has a set winding, a reset winding and $N_X$ data input windings where $N_X$ is the number of functions $F_{XN}$ in the Xth term.

The above stated objects are accomplished in one embodiment of the invention through the provision of a plurality of bistable magnetic cores each of which performs the logical AND function on the data signals applied to its input windings. The logical OR function is accomplished by connecting the output windings of the logical AND cores in a series circuit which also includes the output windings of a pulse stretching core and a clock pulse core. The output windings are connected such that voltages induced in the output windings of the pulse stretching core and the clock pulse core are in opposition to the voltages induced in the output windings of the logical AND cores. The resulting voltage triggers a transistor, the output of which indicates whether the logical proposition is true or false. The output of the transistor is fed to one input winding of the pulse stretching core for stretching the output signal that is then fed to succeeding stages of logic cores.

In a second embodiment of the invention the clock pulse core is replaced by a source which provides a reference voltage having a magnitude substantially equal to the output voltage of one of the logical AND cores. This source is connected to the series circuit through a second transistor which is intermittently turned on by clock pulses to thereby apply the reference voltage to the series circuit in opposition of the voltages induced therein as the logic cores are reset.

A further feature of the present invention is the provision of a novel magnetic core logic circuit for determining the truth of the generalized logical equation, $$\overline{D}=\overline{[F_{11}\cdot F_{12}\cdot - - \cdot F_{1N_1}]+[F_{21}\cdot F_{22}\cdot - - \cdot F_{2N_2}]+[F_{31}\cdot F_{32}\cdot - - \cdot F_{3N_3}]+ - - -+[F_{X1}\cdot F_{X2}\cdot - - \cdot F_{XN_X}]}$$

where the truth of a function $\overline{D}$ or $F_{XN}$ is represented by the absence of a pulse. This embodiment includes one or more magnetic cores for performing the logical AND function. The output winding of each core is connected in a series circuit between the emitter and base of a transistor. The sense of each output winding is such as to apply potential between the base and emitter of the transistor of a polarity tending to make it conductive as the corresponding core is reset.

Other features of the invention and the mode of operation of the various embodiments thereof will become apparent upon consideration of the following description and the accompanying drawings in which.

Figure 3:
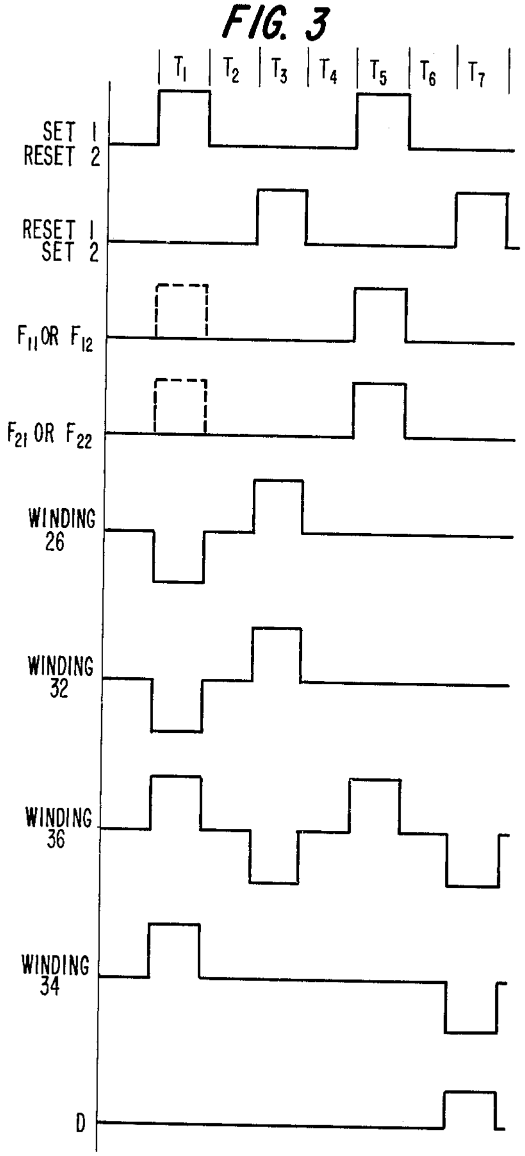
Figure 4:
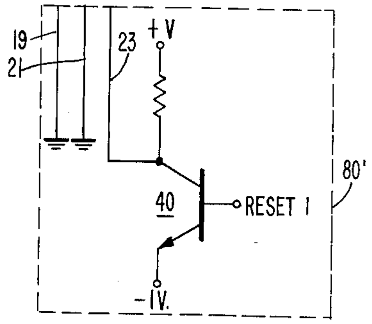
Figure 5:
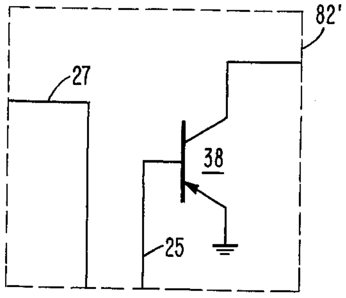
Figure 2:
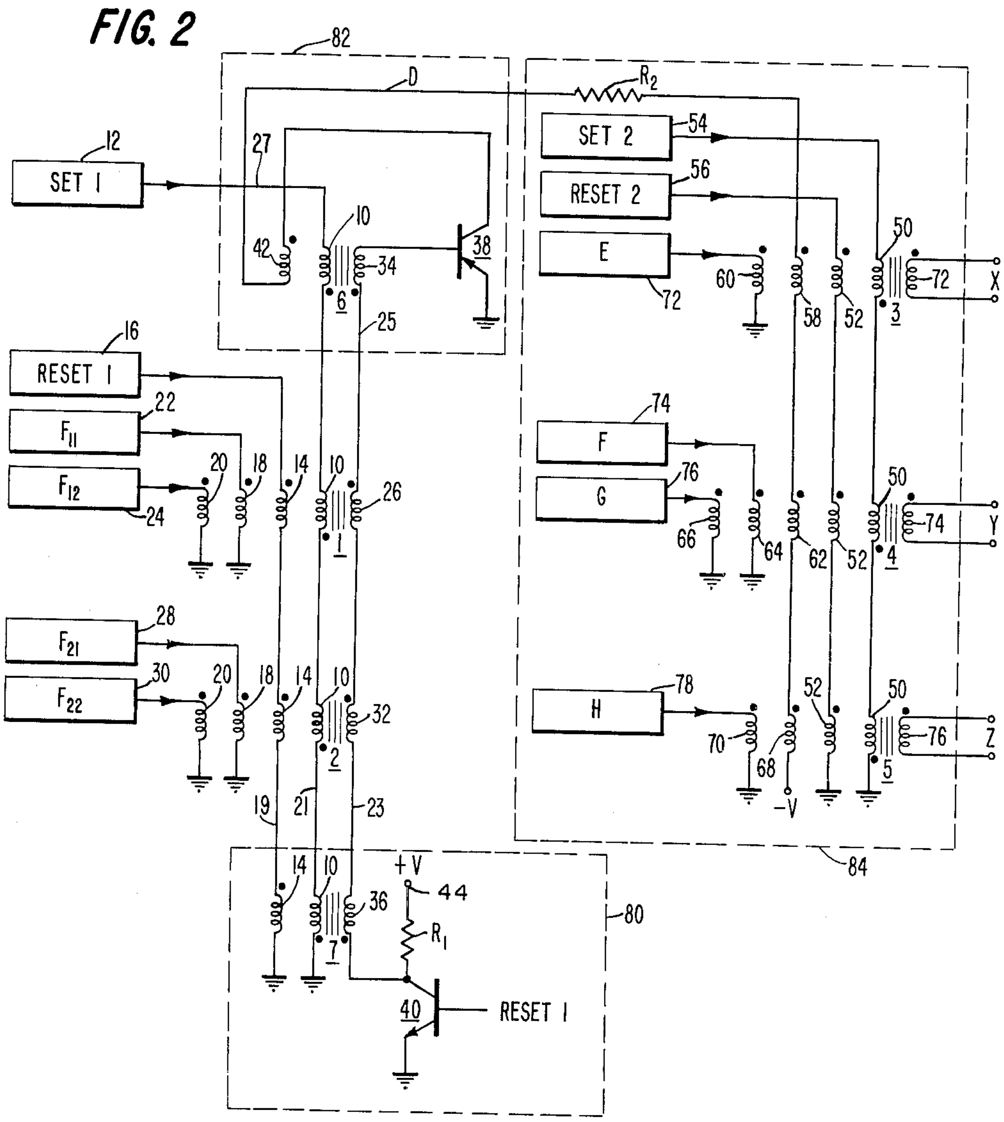
FIGURE 2 shows a first embodiment of the invention.
Figure 2A:
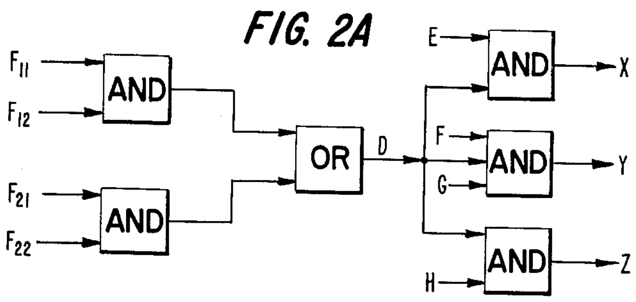
Figures 6, 7:
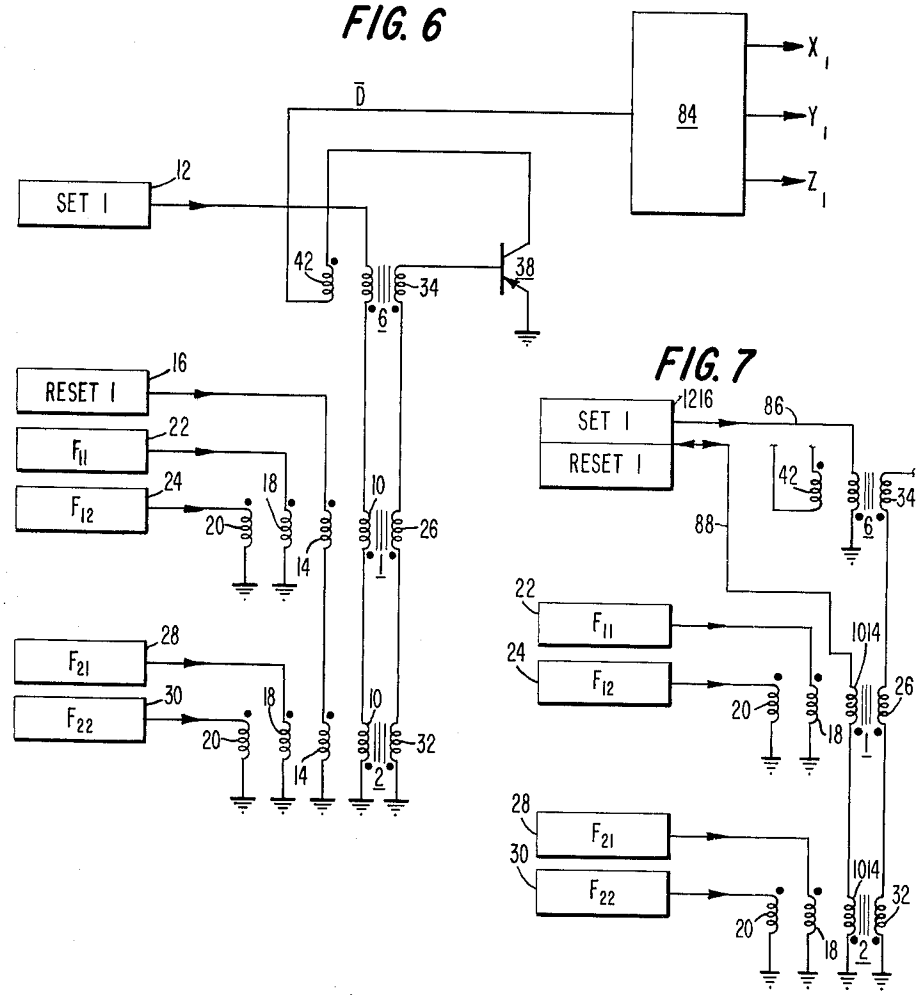
Figure 6A:
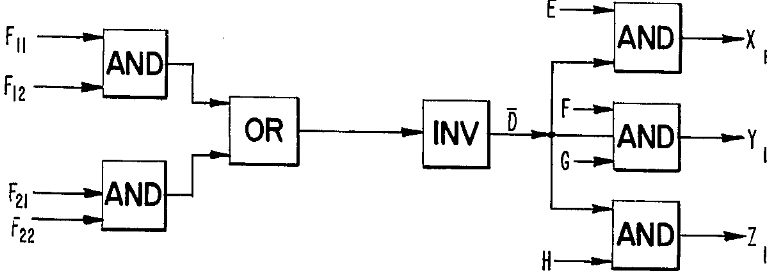

FIGURE 2*a* is a logical block diagram of the circuit shown in FIGURE 2;

FIGURE 3 is a timing diagram illustrating the operation of the circuit shown in FIGURE 2;

FIGURES 4 and 5 show modifications of the circuit of FIGURE 2;

FIGURE 6 shows a second embodiment of the present invention;

FIGURE 6*a* is a logical block diagram of the circuit shown in FIGURE 6; and

FIGURE 7 shows an embodiment wherein a single winding on each core is employed to alternately set and reset the core.

Figure 1:
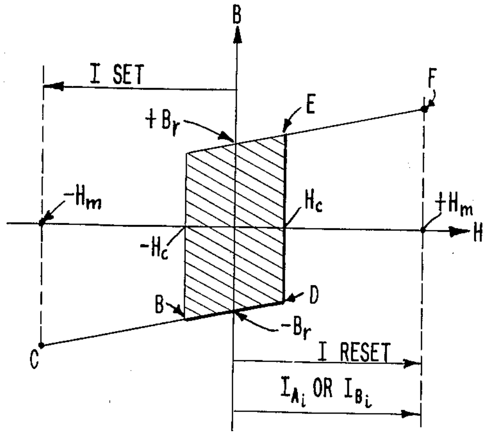
FIGURE 1 is an idealized graph of the hysteresis curve of the bistable magnetic cores used in the present invention.

The magnetic cores utilized in the present invention are preferably made of a material having a reasonably rectangular hysteresis curve such as that shown in FIGURE 1. The cores are bistable and have a first remanent state of magnetization $+B_R$ and a second remanent state of magnetization $-B_R$. The core is considered to be reset if the remanent magnetization is $+B_R$ and is considered to be set if the remanent magnetization is $-B_R$. Assume that the core is set and a current $I_{RESET}$ is applied to an input winding. The RESET current generates a magnetizing force $+H_M$ to switch the core, the magnetization of the core following the curve DEF. The switching of the core induces a voltage in the output winding of the core. Upon removal of the reset current, the magnetization of the core follows the curve FE to the point where the residual magnetization is $+B_R$.

Assuming the core is reset, it may be set by applying a current $I_{SET}$ to generate a magnetizing force $-H_M$. The magnetization of the core switches from $+B_R$ to C upon application of the set current and returns to the point $-B_R$ upon removal of the current. As the core switches it induces a voltage in the output winding, the polarity of this voltage being opposite to that voltage induced as the core is reset.

If the magnetization of the core is at the point $+B_R$ or RESET and a current $I_{A_i}$ or $I_{B_i}$ is applied at the same time as the current $I_{SET}$, the magnetization of the core will not change, since the magnetizing force $+H_M$ generated by $I_{A_i}$ or $I_{B_i}$ is opposed by the magnetizing force $-H_M$ generated by $I_{SET}$. If two currents $I_{A_i}$ and $I_{B_i}$, having the magnitude shown in FIGURE 1, are both applied at the same time as the current $I_{SET}$, the magnetization of the core is shuttled from $+B_R$ to F and back to $+B_R$ thus producing a noise pulse only in the output winding.

The above described characteristics are utilized in the present invention to provide a magnetic AND gate. Consider the magnetic core 1 shown in FIGURE 2. This core has a SET winding 10 to which pulses are applied from source 12 to switch the core to the set state. Core 1 has a RESET winding 14 which receives pulses from source 16 to switch the core to its reset state. Windings 18 and 20 are data signal input windings and selectively receive pulses from the data signal sources 22 and 24 respectively. The core has a single output winding 26 in which a voltage is induced each time the core switches from one stable state to the other.

The following conventions have been adopted in the accompanying drawings. A current applied to an input winding at the end adjacent a dot tends to change the associated core to the RESET state. A current applied to an input winding at the end having no dot tends to change the associated core to the SET state. A dot adjacent one end of each output winding indicates the polarity of the signal induced in the output winding as the associated core is set, the dot being placed adjacent the negative end of the winding.

The truth of a logical function or ONE is represented by the absence of current on an input winding whereas the negation of a logical function or ZERO is represented by the presence of the current on an input winding. That is, if $F_{11}$ is ONE then no current is applied to the input winding 18 but if $F_{11}$ is ZERO then an input current is applied to the winding 18.

Referring to FIGURE 3, assume that during time period $T_1$ a SET 1 pulse is applied to the winding 10 and assume further that during this time period no pulses are applied to data input winding 18 or 20. The SET 1 pulse switches core 1 to the set state and in doing so produces an output voltage in the winding 26. As indicated by the dot adjacent the upper end of winding 26, this end of the winding is negative with respect to the lower end. At time $T_3$, the RESET 1 pulse is applied to winding 14 thereby switching the core to the reset state and inducing a voltage in the output winding 26. At this time the upper end of winding 26 is positive with respect to the lower end.

Suppose, however, that at $T_5$ time and simultaneous with the application of a SET 1 pulse to winding 10, a pulse is applied to winding 18 or winding 20 or both windings 18 and 20. The magnetizing forces of windings 18 and/or 20 oppose the magnetizing force of the SET 1 winding and prevent the core 1 from being switched to its set state. Since no switching of the core takes place, no signal is induced in the winding 26. At time $T_7$ the core 1 is still in the reset state so the RESET 1 pulse merely shuttles the core and produces no output signal.

The specific embodiment of the invention shown in FIGURE 2 determines the truth of the logical proposition, $$D=[F_{11}\cdot F_{12}]+[F_{21}\cdot F_{22}]$$

and the signal indicating whether this proposition is true or false is fed to a succeeding stage of logic cores which determines the truth of the logical propositions, $$X=D\cdot E$$
$$Y=D\cdot F\cdot G$$
$$Z=D\cdot H$$

An important aspect of the invention is the fact that the circuit for determining the truth of the logical proposition, $$D=[F_{11}\cdot F_{12}]+[F_{21}\cdot F_{22}]$$

can be expanded to determine the truth of the generalized logical equation, $$D=(F_{11}\cdot F_{12}\cdot - - \cdot F_{1N_1})+(F_{21}\cdot F_{22}\cdot - - \cdot F_{2N_2}) + - - - +(F_{X1}\cdot F_{X2}\cdot - - \cdot F_{XN_X})$$

merely by inserting additional cores, one for each term of the equation. Each core is provided with $N_X$ data input windings where $N_X$ represents the number of functions F in any given term.

The reason for this will be better understood from the subsequent discussion of FIGURE 2 wherein the cores 1 through 5 each perform the logical AND function, core 6 is a pulse stretching core, and core 7 is a clock pulse core.

Considering first only that portion of the circuit which produces the intermediate signal D, the cores 1, 2, 6, and 7 each have a set winding 10. The set windings are connected in series and supplied with SET 1 pulses from source 12.

Cores 1, 2, and 7 each have a reset winding 14. These reset windings are connected in series and supplied with RESET 1 pulses from source 16.

Core 1 and 2 are each shown as having two input windings 18 and 20 although the number of input windings on each core may be increased or decreased depending upon the number of functions in the logical AND term implemented by the core. The input windings of cores 1 and 2 receive pulses from sources 22, 24, 28 and 30 which may for instance be output windings of logic circuits similar to that under consideration, but controlled by proper SET and RESET pulses.

The output windings 26, 32, 34, and 36 are connected in a series circuit one end of which is connected to the base of transistor 38. The transistor has a grounded emitter and begins to conduct when the base becomes negative.

The output windings 34 and 36 are connected in the series circuit such that they tend to apply positive voltages to the base of transistor 38 as the cores 6 and 7 are set but apply negative voltages to the base of the transistor as the cores 6 and 7 are reset.

On the other hand, windings 26 and 32 are connected in the series circuit such that they tend to apply negative voltages to the base of transistor 38 as the cores 1 and 2 are set but apply positive voltages to the base of the transistor as the cores 1 and 2 are reset.

As explained above, a pulse on either winding 18, winding 20 or both windings 18 and 20, at the time the SET 1 pulse is applied to winding 10 prevents the corresponding logic core from being set. Furthermore, since the core is not set during SET 1 time it is in the reset state and subsequent application of a reset pulse does not switch the core. It is obvious therefore that if a pulse is applied to any or all of the data input windings of core 1 at the time SET 1 pulses are applied, no output voltages are induced in winding 26 at either SET 1 time or RESET 1 time. In like manner, application of pulses to any one or all of the data input windings of core 2 at the time SET 1 pulses are applied prevents output voltages from being induced in winding 32 at either SET 1 time or RESET 1 time.

Stated differently: no voltages are induced in winding 26 if the logical proposition $[F_{11}\cdot F_{12}]$ is false; no voltages are induced in winding 32 if the logical proposition $[F_{11} \cdot F_{22}]$ is false; a negative voltage is induced in winding 26 at SET 1 time and a positive voltage is induced in winding 26 at RESET 1 time if the logical proposition $[F_{11} \cdot F_{12}]$ is true; and finally, a negative voltage is induced in winding 32 at SET 1 time and a positive voltage is induced in winding 32 at RESET 1 time if the logical proposition $[F_{21} \cdot F_{22}]$ is true.

The windings 26, 32, 34, and 36 produce substantially equal magnitude pulses although the polarities of the voltages may differ.

Assume for the moment that the lower end of winding 36 is grounded and that the voltage induced in each output winding has a magnitude 1 v.

If both of the logical propositions $[F_{11} \cdot F_{12}]$ and $[F_{21} \cdot F_{22}]$ are true, the net voltage on the base of transistor 38 at SET 1 time is 0 v. since windings 26 and 32 each contribute —1 v. and windings 34 and 36 each contribute +1 v. At RESET 1 time windings 26 and 32 each contribute +1 v. and winding 36 contributes —1 v. so that the net result is +1 v. which prevents transistor 38 from being turned on. As a result, no collector current flows through the input windings 58, 62, 68 of the subsequent logic stages, and this condition indicates the truth of the logical proposition $$D=[F_{11} \cdot F_{12}]+[F_{21} \cdot F_{22}]$$

The preceding paragraph illustrates the need for transistor 40. It was noted that windings 26 and 32 each contributes an output voltage of —1 v. at SET 1 time if the corresponding logical proposition is true. If more than two logic cores are included in the circuit, say 3, and all logical propositions are true, then the net voltage on the base of transistor 38 at SET 1 time will be —1 v. This has the undesirable effect of turning on transistor 38.

To prevent transistor 38 from being turned on under the conditions set forth, the dot end of the winding 36 is connected through resistor R1 to a voltage source 44 which is positive and of sufficient magnitude to prevent the base of transistor 38 from going negative at SET 1 time. The dot end of the winding 36 is also connected to the collector of transistor 40. The base of transistor 40 is pulsed during RESET 1 time and since the emitter is grounded, the transistor renders the voltage source 44 ineffective by tying the series circuit to ground potential.

Consider now the case where the logical propositions $[F_{11} \cdot F_{12}]$ and $[F_{21} \cdot F_{22}]$ are both false. At SET 1 time windings 26 and 32 produce no output voltages, while windings 34 and 36 produce positive voltages. Voltages induced in the output windings at this time have no effect since transistor 40 is off and the source 44 provides an over-riding positive potential to the base of transistor 38. At RESET 1 time transistor 40 is turned on thereby tying one end of the series circuit to the potential (ground) on the emitter of transistor 38. At RESET 1 time the windings 26, 32, and 34 produce no output voltages but winding 36 produces a negative voltage that turns on transistor 38. The current that flows in the emitter-collector circuit when the transistor is turned on is applied to the winding 42 which is wound in such a manner as to reset the core 6. As the core is reset, it induces a voltage in winding 34 that drives the base of the transistor more negative. Core 6 begins to switch after core 7 and the width of the pulse appearing on lead D may be controlled by permitting only a fraction of the collector current to flow through winding 42 or by using for core 6 a core having a slower switching time than core 7. It is desirable that the output of transistor 38 be stretched by the circuit including core 6 and transistor 38. The duration of the pulses produced in the series circuit by cores 1, 2, and 7 as they are reset are not of the same duration as the RESET 1 pulses or the SET 2 pulses. It is essential that the output of transistor 38 be of the same duration as the SET 2 pulses since the two pulses are applied to succeeding logic stages in opposition to each other, the SET 2 pulse tending to set a succeeding core at the same time as the output of transistor 38 tends to reset the core. It is obvious therefore that if the output of transistor 38 is not of the same duration as the SET 2 pulse, there is a possibility of setting a succeeding core when it should not be set.

It has been shown that a pulse appears on line D if both of the propositions $[F_{11} \cdot F_{12}]$ or $[F_{21} \cdot F_{22}]$ are false and conversely, no output pulse appears on line D if both propositions are true. There is a third possibility wherein one proposition is true and the other false. This possibility results in no output pulse on line D during RESET 1 time and is accomplished as follows.

Voltage source 44 prevents transistor 38 from being turned on during SET 1 time. At RESET 1 time transistor 40 is turned on tying the series circuit to ground. Also, during RESET 1 time winding 36 produces a negative output voltage which is cancelled by a positive signal from either winding 26 or 32. Since one proposition is true and the other false, one of these windings produces a positive voltage and the other no voltage during reset time. The net voltage applied to the base of transistor 38 is zero and the transistor does not conduct.

It is seen therefore that a current on line D at RESET 1 time indicates that the logical proposition $$[F_{11} \cdot F_{12}]+[F_{21} \cdot F_{22}]$$

is false whereas the absence of a current at this time indicates the proposition is true. As shown in FIG. 2, an indication appearing on line D may be fed to subsequent cores that determine the truth of further logical propositions.

The cores 3, 4, and 5 function in the same manner as cores 1 and 2 and are parts of circuits similar to the one formed by cores 1, 2, 6, 7 and transistors 38 and 40.

The cores 3, 4 and 5 each have a set winding 50 and a reset winding 52. The set windings are connected in series to a source of SET 2 pulses 54. The reset windings are connected in series to a source of RESET 2 pulses 56. The SET 2 pulses occur at the same time as the RESET 1 pulses and may be supplied from a single source. In like manner, the RESET 2 pulses occur at the same time as the SET 1 pulses and these may be supplied from a single source.

Core 3 has two input windings 58 and 60. Core 4 has three input windings 62, 64, and 66 and core 5 has two input windings 68 and 70. Pulses applied to these windings tend to reset the cores. The windings 58, 62, and 68 are connected in series to the line D. Windings 60, 64, 66, and 70 receive data pulses from sources 72, 74, 76, and 78 respectively.

Core 3 determines the truth of the logical proposition $[D \cdot E]$ and produces an output voltage on winding 72 at RESET 2 time if the proposition is true. If the proposition is false, no voltage appears on winding 72 at RESET 2 time.

Core 4 determines the truth of the logical proposition $[D \cdot F \cdot G]$ and produces an output voltage on winding 74 at RESET 2 time if the proposition is true.

Core 5 determines the truth of the logical proposition $[D \cdot H]$ and produces an output voltage on winding 76 at RESET 2 time if the proposition is true.

As a specific example consider the case where $[D \cdot E]$ is true as represented by the absence of pulses on windings 58 and 60 during SET 2 (RESET 1) time. The SET 2 pulse sets core 3 and the subsequent application of the RESET 2 pulse to winding 52 again switches the core to produce an output signal in winding 72.

On the other hand, if the proposition $[D \cdot E]$ is false a pulse appears on either or both of the windings 58 and 60. This pulse prevents the SET 2 pulse from setting core 3, and it remains in the reset state. At RESET 2 time the core is shuttled but not switched so no output pulse appears on winding 72.

Since cores 3, 4, and 5 function in the same manner as cores 1 and 2, the output pulses on windings 72, 74, and 76 serve to cancel the output pulses of the clock cores in their respective circuits. In the absence of output pulses on windings 72, 74, and 76 during RESET 2 time the transistors in their respective circuits may be turned on by the outputs of the corresponding clock cores. This shows that the output of circuits controlled by SET 1 and RESET 1 clocks can be fed to the inputs of circuits controlled by SET 2 and RESET 2 clocks and vice versa. Thus, logical chains of any length can be easily formed.

The basic circuit shown in FIGURE 2 may be modified by omitting the clock core 7 and connecting the base of transistor 38 to a source of reference voltage during RESET 1 time by turning on the transistor 40. The reference voltage should be equal in magnitude to the voltage induced in one of the output windings 26 or 32 as the corresponding core is reset and may, for example, be −1 volt. This modification is shown in FIGURE 4 wherein the elements shown within block 80′ may be substituted for the elements within block 80 of FIGURE 2. In this modification, the −1 volt level turns on the transistor 38 during RESET 1 time unless the core 1 produces a positive voltage on winding 26 or the core 2 produces a positive voltage on winding 32. Since winding 26 produces an output that is positive if the proposition $[F_{11} \cdot F_{12}]$ is true and the winding 32 produces a positive voltage if the proposition $[F_{21} \cdot F_{22}]$ is true, it is obvious that the transistor 38 will be turned on under the same conditions as those described with reference to FIGURE 2. The only difference is that the −1 v. signal normally supplied as the core 7 is reset now supplied through the transistor 40 at RESET 1 time.

However, a comparison of the embodiments of FIGURES 2 and 4 shows that the clock core 7 provides a great advantage in that its presence enables less stringent control of the RESET 1 pulse source.

Consider first the modification shown in FIGURE 4. The RESET 1 pulse applied to the base of transistor 40 must correspond to the time and duration of the positive pulses induced in windings 26 and/or 32 as either core 1 and/or core 2 is reset. If cores 1 and 2 are slow in switching, the transistor 40 will be turned on and the reference voltage −1 v. applied to the series circuit before windings 26 and/or 32 produce a positive voltage to cancel its effect. This results in the transistor 38 being erroneously turned on even though the proposition $D=[F_{11} \cdot F_{12}]+[F_{21} \cdot F_{22}]$ is true. In like manner, if the cores 1 and/or 2 switch too fast, because of a variation in the output of RESET 1 pulse source 16, the positive voltages induced in windings 26 and 32 will fall off too early. Therefore, the −1 v. reference voltage will still be present when the induced voltages fall off and the resulting negative voltage will erroneously turn the transistor 38 on.

The problem of control of the RESET 1 pulses is alleviated by the embodiment of FIGURE 2. Note that in this circuit a ground potential is connected to the series circuit when the transistor 40 is turned on. Therefore, it makes no difference whether this transistor is turned on early or late because the transistor 38 cannot be turned on by the ground potential.

As explained above, the winding 36 of core 7 provides the −1 v. for turning on transistor 38. This core is reset by the winding 14 which is connected to RESET 1 source 16 through a series circuit which also includes the reset windings 14 of cores 1 and 2. Therefore, any variation in the RESET 1 signal that causes a variation in the time or duration of the signals induced in windings 26 and 32 will cause a corresponding variation in the clock pulse induced in winding 36.

The basic circuit shown in FIGURE 2 may also be modified by removing the pulse stretching core 6 and this modification is shown in FIGURE 5 wherein the elements within block 82′ may be substituted for the elements of block 82 as shown in FIGURE 2. The logical operation of the modified circuit is the same as the operation of the embodiment shown in FIGURE 2. However, the output pulse of transistor 38 will show pulse stretching due to storage time only and to achieve proper operation of the modified circuit, the duration of the SET pulse must be made shorter with a corresponding increase of current.

FIGURE 6 shows a typical inverting circuit according to the present invention. The circuit determines the truth of the logical equation $$\overline{D}=\overline{[F_{11} \cdot F_{12}]+F_{21} \cdot F_{22}]}$$

and may be expanded by the addition of further cores to solve the generalized logical equation $$\overline{D}=[F_{11} \cdot F_{12} \cdot - - \cdot F_{1N_1}]+[F_{21} \cdot F_{22} \cdot - - \cdot F_{2N_2}]+[F_{31} \cdot F_{32} \cdot - - \cdot F_{3N_3}]+ - - - +[F_{X1} \cdot F_{X2} \cdot - - \cdot F_{XN_X}]$$

where the truth of a function F is represented by the absence of a pulse on an input winding and the truth of of the function $\overline{D}$ is r epresented by the absence of an output pulse.

The elements of FIGURE 6 correspond to certain elements of FIGURE 2 and are assigned corresponding reference numreals. Note, however, that the lower end of the series circuit comprising windings 26, 32, and 34 is grounded and the windings 26 and 32 are wound in the opposite sense from that shown in FIGURE 2. That is, windings 26 and 32 apply positive voltages to the base of transistor 38 as the cores 1 and 2 are set and apply negative voltages to the transistor as the cores are reset.

If either the proposition $[F_{11} \cdot F_{12}]$ or the proposition $[F_{21} \cdot F_{22}]$ is true and the other is false, then either core 1 or core 2 is set at SET 1 time with the other core remaining reset. At RESET 1 time the core which was set is now reset and produces a negative voltage on the base of transistor 38. The transistor is turned on and collector current flows thereby indicating $\overline{D}$ is false.

If both the propositions $[F_{11} \cdot F_{12}]$ and $[F_{21} \cdot F_{22}]$ are false, then neither core 1 nor core 2 is set and the cores remain reset. At RESET 1 time the cores are shuttled but not switched and no voltage is applied to the transistor. The transistor remains off thereby indicating $\overline{D}$ is true.

If both propositions $[F_{11} \cdot F_{12}]$ and $[F_{21} \cdot F_{22}]$ are true then both cores 1 and 2 will be set at SET 1 time and reset at RESET 1 time. The resulting negative voltages turn on the transistor to indicate that $\overline{D}$ is false.

The output of transistor 38 is stretched by the action of core 6 in the manner explained above and may be fed to a furthre stage of logic circuits 84 similar to the ones shown in FIGURE 2.

The embodiment shown in FIGURE 7 is quite similar to that shown in FIGURE 6 and the operation of the cores 1, 2, and 6 is the same in both cases. However, in FIGURE 7, the cores 1 and 2 each have a single winding 1014 which replaces the set winding 10 and the reset winding 14 shown in FIGURE 6. That is, winding 1014 performs both the set and reset functions.

Assuming all cores are reset, the circuit functions as follows. At SET 1 time current from source 1216 is applied over lead 86 to set core 6 and at the same time applies a signal over lead 88 to set cores 1 and 2. Core 1 is set at this time if no signals are applied to its function signal input windings 18 or 20 to oppose the setting of the core. In like manner, core 2 is set by the SET 1 current if no signals are applied to either of its function signal input windings 18 or 20. At Reset 1 time, source 1216 applies a current over lead 88 to the windings 1014, this current being opposite in polarity to that produced by source 1216 at SET 1 time. This current resets cores 1 and/or 2 if they have been previously set by source 1216. The voltages induced in output windings 26 and 32 are utilized in the manner described with reference to FIGURE 6.

It will be obvious to those skilled in the art that each pair of set and reset windings 10 and 14 shown in FIGURE 2 may likewise be replaced by a single winding 1014 which functions to alternately set and reset the cores 1, 2, and 7 in response to SET 1 and RESET 1 pulses produced by the single source 1216.

It is seen therefore that the present invention provides simple, economical and reliable transistor core logic circuits requiring a minimum number of transistors and cores because the cores perform double functions. The only requirement for the magnetic cores is a reasonable squareness of the hysteresis curve of the magnetic material. Therefore, the cores may be of the metallic tape wound variety or of the type used in ferrite memory and switching circuits. Each winding may comprise a single turn. A further economy of circuits should be noted. The noise suppressing transistor 40 shown in FIGURE 2 may be shared with other logic circuits.

While the novel features of the invention as applied to preferred embodiments have been shown and described, it will be obvious that various omissions and substitutions in the form and details of the device as illustrated may be made without departing from the spirit and scope of the invention. For example, either NPN or PNP transistors may be utilized provided the polarities of output windings are reversed accordingly. In addition, the circuits shown may be modified to achieve majority logic either by proper bias on individual logic cores or by increasing the number of turns in the output winding of the clock core so that a positive output of two logic cores is required to cancel the clock core output. Other modifications will become apparent to those skilled in the art. It is intended therefore to be limited only by the scope of the appended claims.

I claim:

1. In a magnetic core logic circuit wherein a plurality of magnetic cores, each having an output winding, winding means for setting and resetting said cores and a plurality of function signal input windings, are set and reset alternately by set and reset pulses, and wherein a function pulse on an input winding prevents the setting of the corresponding core to thereby indicate the function is false, the improvement comprising: a series circuit having included therein the output winding of each of said cores; a transistor connected to said series circuit; a source of bias potential connected to said series circuit for maintaining said transistor in the off condition; a reference voltage source for producing a reference voltage equal in magnitude and opposite in phase to the voltage induced in one of said output windings as a core is reset; and means responsive to said reset pulses for rendering said bias potential inoperative and applying said reference voltage to said series circuit, whereby said transistor is rendered conductive if all of said magnetic cores had a function pulse applied to at least one input winding thereof at the time said set pulses were applied, and said transistor remains non-conductive if at least one of said magnetic cores had no function pulses applied to any of the input windings thereof at the time said set pulses were applied.

2. In a magnetic core logic circuit wherein a plurality of magnetic cores, each having an output winding, winding means for setting and resetting said cores and a plurality of function signal input windings, are set and reset alternately by set and reset pulses, and wherein a function pulse on an input winding prevents the setting of the corresponding core to thereby indicate the function is false, the improvement comprising: a first circuit having included therein the output winding of each of said cores; a transistor connected to said first circuit; a source of bias potential connected to said circuit for maintaining said first transistor in the off condition; a further magnetic core having set and reset windings to which said set and reset signals are applied and an output winding connected in said first circuit, said output winding being connected in said first circuit such that the voltage induced therein opposes the voltages induced in the output windings of said plurality of cores; and means responsive to said reset pulses for rendering said bias potential inoperative and connecting said first circuit to ground, whereby said transistor is rendered conductive if all of said plurality of magnetic cores had a function pulse applied to at least one input winding thereof at the time said set pulses were applied, and said transistor remains non-conductive if at least one of said plurality of magnetic cores had no function pulses applied to any of the input windings thereof at the time said set pulses were applied.

3. A magnetic core logic circuit comprising: a plurality of bistable magnetic cores each settable to a first state or a second state; winding means for each of said cores for setting said cores to said first state; and resetting said cores to said second state; a plurality of data signal input windings for each of said cores tending to reset said cores to said second state; an output winding for each of said cores, said output windings being connected together in a series circuit; means for alternately applying set and reset signals to said winding means, said set or said reset signals being applied simultaneously to all said winding means; means for selectively applying signals to said data signal input windings during the time said set signals are being applied to said winding means; a transistor having the base thereof connected to one end of said series circuit; and means for applying a reference voltage to said series circuit at the time reset signals are applied to said winding means, said output windings being linked to said cores such that voltages induced therein at the time said reset signals are applied oppose said reference voltage whereby said transistor remains cut off when said reset signals are applied if at least one of said cores had no signals applied to any of its data input windings.

4. A magnetic core logic circuit as claimed in claim 3 wherein said means for applying a reference voltage comprises: a source of reference voltage, a second transistor having a collector connected to said series circuit, a base responsive to said reset signals, and an emitter connected to said reference voltage; and a source of bias potential connected to said series circuit for maintaining said first named transistor in the off condition in the absence of reset signals at the base of said second transistor.

5. The combination as claimed in claim 3 wherein said means for applying a reference voltage comprises: a further bistable magnetic core having a first winding responsive to said means for applying set signals, a second winding responsive to said means for applying reset signals, and an output winding connected in said series circuit to induce therein said reference voltage.

6. The combination as claimed in claim 5 and further comprising: a second transistor having a base, a grounded emitter, and a collector connected to said series circuit; a source of bias potential connected to said series circuit, said bias potential being of sufficient magnitude to maintain said first named transistor in the off condition; and means for applying reset signals to the base of said second transistor to thereby deactivate said bias potential and connect said series circuit to ground.

7. A magnetic core logic circuit for determining the truth of the logical equation:

$$D=[F_{11}\cdot F_{12}\cdot\text{---}\cdot F_{1N_1}]+[F_{21}\cdot F_{22}\cdot\text{---}\cdot F_{2N_2}]$$
$$[F_{31}\cdot F_{32}\cdot\text{---}\cdot F_{3N_3}]+\text{---}[F_{X1}\cdot F_{X2}\cdot\text{---}\cdot F_{XN_X}]$$

where the truth of a function is represented by the absence of a signal, said logic circuit comprising: X bistable magnetic cores having a set state and a reset state, each core having N input windings, N corresponding to the number of function signals to be applied to each core; means for applying set pulses to each of said cores simultaneously;

means for selectively applying function signals to said input windings tending to reset said cores, said function signals being applied simultaneously with the application of said set pulses; means for applying reset pulses to each of said cores simultaneously; an output winding for each of said magnetic cores said output windings being connected to form a series circuit; and means responsive to the presence of a signal on at least one of said output windings for indicating that said logical equation is true, said last named means comprising a transistor having the base thereof connected to said series circuit, means for producing a reference voltage equal in magnitude to the output voltage induced in said series circuit by a single one of said output windings, and means for applying said reference voltage to said series circuit in opposition to said output voltages at the time said reset pulses are applied, whereby said transistor responds to said reference voltage to produce an output signal indicating that D is false if none of said output windings produces an output voltage when said reset signals are applied, but said transistor remains off if at least one of said output windings produces a voltage to oppose said reference voltage when said reset signals are applied.

8. A magnetic core logic circuit as claimed in claim 7 wherein said means for applying said reference voltage to said series circuit comprises a second transistor having an emitter and collector in series between said means for producing said reference voltage and said series circuit, and a base responsive to said reset signals for rendering said second transistor conductive; and a source of bias potential connected intermediate the base of said first named transistor and the collector of said second transistor for maintaining said first named transistor off in the absence of said reset pulses.

9. A magnetic core logic circuit as claimed in claim 7 wherein said means for producing said reference voltage comprises a further magnetic core having one input winding connected to said means for applying set pulses, a second input winding connected to said means for applying reset pulses, and an output winding connected in said series circuit to induce said reference voltage therein; said logic circuit further comprising means for normally applying a bias voltage to the base of said transistor to maintain said transistor in the non-conducting state, and means responsive to said means for applying reset pulses for rendering said bias voltage inoperative to maintain said transistor in the non-conducting state.

10. A magnetic core logic circuit as claimed in claim 9 wherein said means for rendering said bias voltage inoperative comprises a second transistor having an emitter connected to ground, a collector connected to said series circuit, and a base connected to said means for applying reset pulses.

11. A magnetic core logic circuit comprising: first and second, third and fourth bistable magnetic cores each having a set state and a reset state; means for applying set pulses to each of said cores simultaneously; a plurality of data signal input windings for said second core and said third core tending to reset said cores; means for applying signals to said data signal input windings at the same time said set pulses are applied to said cores; a series circuit including an output winding for each of said cores, said output windings being inductively linked to said cores such that the voltages induced in said series circuit as said first and fourth cores are set oppose the voltage induced in said series circuit as said second and third cores are set; means for simultaneously applying reset pulses to said second, third and fourth cores; and a transistor responsive to the voltage induced in said series circuit as said core is reset for producing an output pulse if no voltages are induced in said series circuit by either said second or said third core as said reset pulses are applied.

12. The combination as claimed in claim 11 and further comprising a reset winding responsive to said output pulse for resetting said first core to thereby induce in said series circuit a voltage of the same polarity as the voltage induced therein as said fourth core is reset.

13. The magnetic core logic circuit as claimed in claim 12 having an output lead and wherein said transistor has a base, collector, and emitter, said series circuit being connected between said base and said emitter; and said reset winding of said first core is connected between said collector and said output lead whereby said transistor is rendered more conductive and the output pulse of said transistor is stretched as said first core is reset.

14. A magnetic core logic circuit for determining the truth of the logical proposition $$\overline{D}=\overline{[F_{11}\cdot F_{12}]+[F_{21}\cdot F_{22}]}$$

where the truth of a function F or $\overline{D}$ is represented by the absence of a signal on an input winding and the negation of a function F or $\overline{D}$ is represented by the presence of a signal, said circuit comprising: first and second magnetic cores each having two input windings tending to reset said cores, a reset winding, and a set winding; means for applying set signals to all of said set windings simultaneously, means for selectively applying function representing signals to said input windings at the time said set pulses are applied; means for applying reset signals to each of said reset windings simultaneously; a transistor having a base, emitter, and collector; an output winding for each of said cores, said output windings being connected between said base and said emitter so as to turn said transistor on at the time said reset signals are applied if said cores are set by said set signals previous to application of said reset signals, whereby collector current flows if $\overline{D}$ is false and a third magnetic core having a set winding connected to said means for applying set pulses, an output winding in circuit between said base and said emitter, and an input winding connected to said collector and responsive to current therethrough for resetting said third core, said output winding being linked to said third core such that said transistor is rendered conductive as said third core is reset.

15. A magnetic core logic circuit for determining the truth of a generalized logical equation of the form $$\overline{D}=\overline{[F_{11}\cdot F_{12}\text{- - -}F_{1N_1}]+[F_{21}\cdot F_{22}\text{- - -}F_{2N_2}]+[F_{31}\cdot F_{32}\text{- - -}F_{3N_3}]+\text{- - -}[F_{X1}\cdot F_{X2}\text{- - -}F_{XN_X}]}$$

where the truth of a function $F_{NX_X}$ is represented by the absence of a signal on an input winding and the truth of the function $\overline{D}$ is represented by the absence of an output pulse, said circuit comprising X magnetic cores each having $N_X$ input windings where X is the number of terms in the equation and $N_X$ is the number of functions in the Xth term in the equation; winding means for setting and resetting each of said cores; means for simultaneously applying set pulses to said winding means; means for selectively applying function signals to said input windings at the time said set pulses are applied to said set winding means, means for applying reset pulses simultaneously to each of said reset winding means; a transistor having a collector, emitter and a base; and an output winding for each of said cores, said output windings being connected in series and linked to said cores whereby the voltages induced in said output windings as said cores are reset are added to produce a resultant voltage, means normally biasing said transistor in the off condition at least during the time said set pulses are being applied to said cores, said base being connected through said series circuit to said biasing means; and a further magnetic core having a reset winding connected to said collector, a set winding responsive to said set signals, and an output winding connected in said series circuit, said output winding of said further core being connected in said series circuit such that the voltage induced in said output winding as said core is reset tends to turn said transistor on.

16. A magnetic core logic circuit comprising: a plurality of bistable magnetic cores each settable to a first state or a second state; winding means for each of said cores for setting and resetting each of said cores to said first or said second state; a plurality of data signal input windings for each of said cores tending to reset said cores to said second state; an output winding for each of said cores, said output windings being interconnected to form an output winding circuit having two ends; means for applying set signals simultaneously to all of said winding means; means for selectively applying signals to said data signal input windings during the time said set signals are being applied to said winding means; means for applying reset signals simultaneously to all of said winding means; an electronic element having an input connected to one end of said circuit; a source of bias potential connected to said circuit for normally maintaining said electronic element non-conducting; means for applying a reference voltage to said output winding circuit at the time reset signals are applied to said winding means said reference voltage being of the same magnitude as the voltage induced in said circuit by one output winding as a core is reset, said output windings being linked to said cores such that voltages induced therein at the time said reset signals are applied oppose said reference voltage; and means for rendering said bias potential inoperative at the time said reset signals are applied, whereby said electronic element remains non-conducting when said reset signals are applied if at least one of said cores had no signals applied to any of its data input windings.

17. The combination as claimed in claim 16 wherein said means for rendering said bias potential inoperative comprises a second electronic element responsive to said means for applying reset signals for connecting said reference voltage to said output winding circuit.

18. The combination as claimed in claim 16 wherein said means for rendering said bias potential inoperative comprises a second electronic element responsive to said means for applying reset signals for connecting said output winding circuit to ground potential, and said means for applying a reference voltage comprises a further core having one input winding connected to said means for applying set signals, a second input winding responsive to said means for applying reset signals and an output winding connected in said output winding circuit.

19. A magnetic core logic circuit comprising first and second pluralities of bistable magnetic cores each having an output winding, a set winding, a reset winding and at least one input winding, said input windings being wound on said cores such that pulses applied thereto at the time pulses are applied to said set windings prevent said cores from being set; a first circuit interconnecting the output windings of said first plurality of cores; a second circuit interconnecting the output windings of said second plurality of cores; first and second transistors connected to said first and second circuits respectively; first and second sources of bias potentials for normally maintaining said transistors non-conducting; first and second sources of reference voltages, said reference voltages being of the same magnitude but opposite in phase to the voltage induced in one of said output windings as a core is reset; first control means for rendering said first source of bias potential inoperative and applying said first reference voltage to said first circuit; second control means for rendering said second source of bias potential inoperative and applying said second reference voltage to said second circuit; means for applying pulses to the set windings of said first plurality of cores and said second control means at the same time pulses are applied to the reset windings of said second plurality of cores and for applying pulses to the reset windings of said first plurality of cores and said first control means at the same time pulses are applied to the set windings of said second plurality of cores; means for connecting the output of said first transistor to at least one input winding of each core in said second plurality of cores, means for selectively applying pulses representing the negation of functions to the input windings of said first plurality of cores at the time pulses are applied to the set windings of said first plurality of cores; and means for selectively applying pulses representing the negation of functions to the remaining input windings of said second plurality of cores at the time pulses are applied to the set windings of said second plurality of cores, whereby said second transistor fails to conduct if at least one core of said first plurality and one core of said second plurality had no pulses applied to the input windings thereof.

20. A magnetic core logic circuit as claimed in claim 19 wherein said means for applying the output of said first transistor to input windings of cores in said second plurality of cores comprises; a further magnetic core having a set winding, a reset winding connected between said transistor and at least one input winding of each of said cores in said second plurality, and an output winding connected in said first circuit, said output winding being linked to said further core such that the voltage induced therein is of the same phase as said first reference voltage.

21. A magnetic core logic circuit comprising; a plurality of magnetic cores each settable to a first state or a second state; winding means for each of said cores for setting said cores to said first state and resetting said cores to said second state; means for alternately applying set and reset signals to said winding means, said set or reset signals being applied simultaneously to all said winding means; a plurality of data signal input windings for each of said cores and linked to said cores whereby a data signal input tends to reset the core to which it is linked; means for selectively applying signals to said data signal windings during the time said set signals are being applied to said winding means; a transistor having a collector, emitter and a base; an output winding for each of said magnetic cores, said output windings being connected in series and linked to said cores whereby the voltages induced in said output windings as said cores are reset are added to produce a resultant voltage; means normally biasing said transistor in the off condition at least during the time said set signals are being applied to said cores, said base being connected through said series circuit to said biasing means; and a further magnetic core having a reset winding connected to said collector, a set winding responsive to said set signals, and an output winding connected in said series circuit, said output winding of said further core being connected in said series circuit such that the voltage induced in said output winding as said core is reset tends to turn said transistor on.

22. A magnetic core logic circuit as claimed in claim 3 wherein said winding means for each of said cores comprises a set winding responsive to said set signals and a reset winding responsive to said reset signals.

23. A magnetic core logic circuit as claimed in claim 2 wherein said winding means for each of said cores comprises a set winding responsive to said set pulses and a reset winding responsive to said reset pulses.

No references cited.

IRVING L. SRAGOW, *Primary Examiner.*